Figure 1:
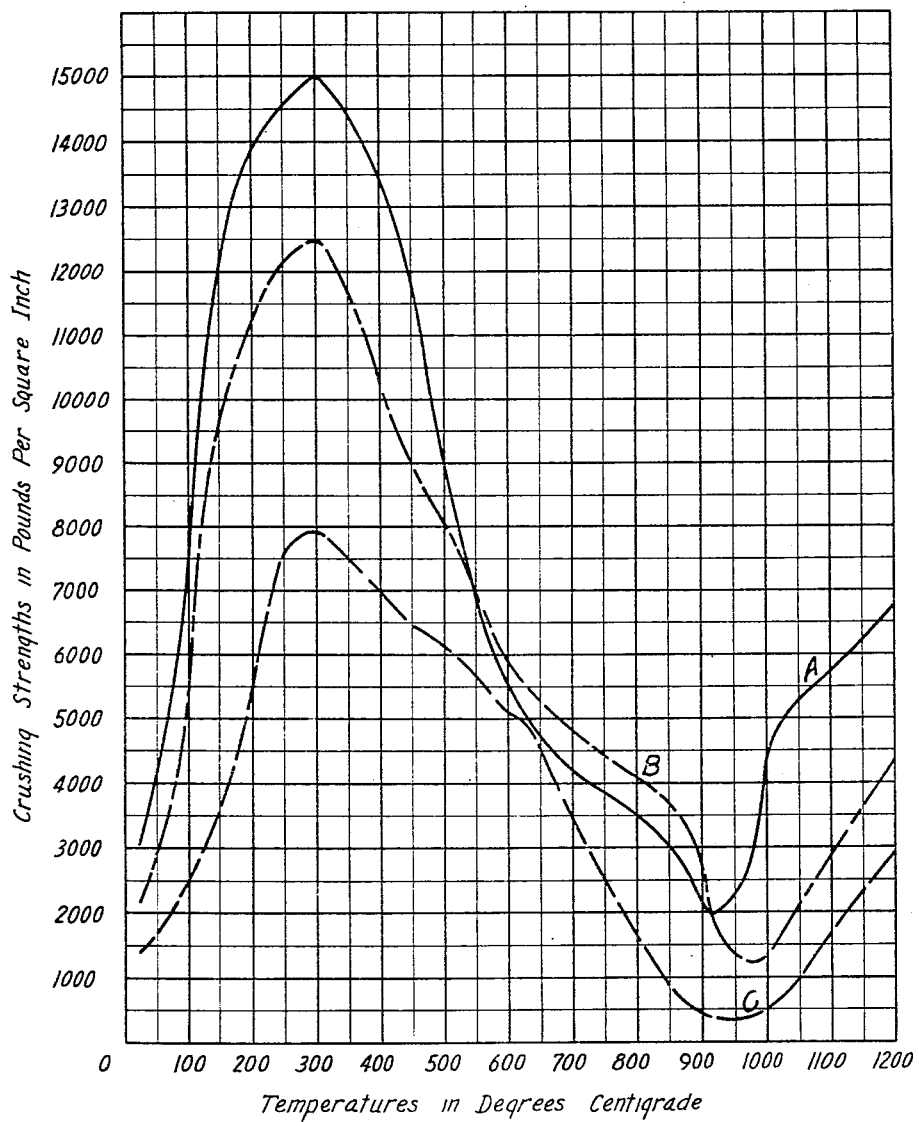

United States Patent Office 2,702,751
Patented Feb. 22, 1955

2,702,751

REFRACTORY CEMENTITIOUS COMPOSITION

Leslie W. Austin, San Jose, and Jack T. Elmer and Berton G. Altmann, Los Gatos, Calif., assignors to The Kaiser Aluminum & Chemical Corporation, Oakland, Calif., a corporation of Delaware Application June 7, 1951, Serial No. 230,302

34 Claims. (Cl. 106—59)

This invention relates to non-acid refractories and methods of making the same; more particularly, to such refractories having increased strengths under load after firing to intermediate firing temperatures and exhibiting very rapid increase in strength from intermediate to higher firing temperatures, and which are also suitable for producing monolithic refractory masses.

With the development of higher temperature metallurgical processes, there has arisen the need for refractory materials and finished refractories which are capable of withstanding the operating conditions of the new processes. A number of high temperature refractories have been produced but further problems have appeared in their application in industrial installations. For instance, when a chemically bonded refractory is installed in a furnace or the like and fired in place, the fired or ceramic bond develops well in the portion of the refractory facing the hot zone. However, the refractory being a relatively poor conductor of heat, the development of this bond does not progress rapidly to the outer, or cooler, face of the material. The outside may remain substantially chemically bonded, while the portions of the refractory lying between the cooler face and the fired face will be heated only to intermediate temperatures. The chemical bond is usually very strong and resistant to breakdown under load, and the ceramic bond is very strong, but a zone of weakness occurs as the refractory passes through the intermediate firing temperature range. Another disadvantage of many of the earlier known refractories is that the bonding material undergoes considerable change in volume, usually shrinkage, under firing. These shrinkage cracks may develop in some cases by a prior swelling caused by hydration. Among other disadvantages, this results in cracks which will permit molten metal or slag to penetrate, or "strike through," the refractory lining; and it results in weakening the refractory so that the load-bearing characteristics thereof are materially diminished.

It is an object of this invention to provide refractory materials having higher load strengths after intermediate firing temperatures. It is a further object to provide refractory materials in which the temperature range of the zone of weakness is diminished, so that strengths increase more rapidly after the minimum strength is reached. It is still another object to provide a refractory bond or cement having increased volume stability upon curing or firing. Other objects will appear from the description below.

According to the present invention a refractory or semi-refractory material is provided which comprises finely divided magnesia, a chromium compound which is soluble in the liquid employed to form, or temper, the mixture, and a compound of boron. This refractory material can be employed as a bond, for example, for grains or aggregate, in forming refractory shapes, ramming mixes or maintenance material, or it can be employed as a mortar or cement, and it is especially useful in forming cast refractory products. The unfired refractory material of this invention which, for convenience, will be termed cementitious refractory material or composition, comprises from 0.25% to 5.0% of the boron compound, calculated as $B_2O_3$, chromium compound, calculated as $CrO_3$, in an amount by weight of from two-thirds to three times the amount of the boron compound calculated as $B_2O_3$, and the remainder consisting essentially of finely divided magnesia. Preferably, where maximum strength is desired, the composition contains, within the aforesaid limits, from 0.75% to 1.2% of the chromium compound, calculated as $CrO_3$, and the ratio of chromium compound, as $CrO_3$ equivalent, to boron compound as $B_2O_3$ equivalent is from 1:1 to 1.5:1 the remaining being essentially magnesia, as defined. An excellent composition having high cold, intermediate and burned strength contains 1.0% of a water-soluble chromium compound calculated as $CrO_3$, 1.0% of a water-soluble boron compound calculated as $B_2O_3$, and the remainder finely divided, high-purity magnesia. The addition of the boron compound enables the prevention of cracks and similar evidences of shrinkage or swelling as the mix dries; that is to say, the boron compound inhibits cracking, or in other words, provides volume stability. The higher ratios of chromium compound enable obtaining higher strengths at higher firing or service temperatures. Where the mixed and shaped or formed composition is to be stored or held, particularly at temperatures above room temperature prior to firing, the lower ratios of chromium compound, e. g. not over about 1:1 are preferred because of improved volume stability. The amounts stated are based on the total dry weight of unfired cementitious composition.

The chromium compounds useful in this invention are those which are soluble in the liquid employed to mix or temper the composition. This liquid is preferably water, but another liquid, such as alcohol, for example, can alternatively be employed, for instance, as where an alcohol-soluble chromium sulfate is added. The chromium compounds which can be employed include chromic acid, chromium salts and chromium-containing salts, for example, chromous sulfate, chromic sulfate, chromous acetate, chromic acetate, the chromous and chromic halides, chromium nitrate, chromium oxalate, and the chromates and dichromates of the alkali metals, e. g. sodium and potassium, and of ammonium and magnesium chromate and dichromate. Where using the salts containing chromium in the positive radical, the mixes tend to set or harden quite rapidly in the air and it is frequently more desirable to employ the compounds containing chromium in the negative radical to avoid very rapid setting. Furthermore, chromic acid, magnesium chromate or dichromate, or ammonium chromate or dichromate are particularly suitable for high temperature installations because they not only perform very well but, in addition, they provide no constituent other than magnesia and chromium oxide in the final, fired refractory. Mixtures of the chromium compounds can be employed.

The boron compound can be, for example, a boric acid such as orthoboric acid, $H_3BO_3$, or metaboric, pyroboric or tetraboric, or perboric acid, or a salt of such boric acid, for example, sodium borate, sodium perborate, sodium tetraborate, sodium metaborate, or potassium or ammonium perborate, tetraborate, metaborate or acid borate, or calcium or magnesium borates, etc. To obtain maximum inhibition of swelling during hydration, it is preferred to employ a boron compound soluble in the mixing or tempering liquid. For example, boric acid is soluble in water; sodium perborate, in alcohol. To obtain the highest intermediate strengths, it is preferred to employ orthoboric acid or a salt of orthoboric acid which is adapted to react with magnesium oxide, in the presence of the chromium component of the cement, for example, ammonium borate. Organic boron compounds can be employed. Mixtures of the boron compounds can be employed.

The magnesia which is employed can be that obtained by calcining natural ores, such as magnesite or brucite; or it can be obtained by calcining any magnesium compound which yields magnesium oxide upon calcination, e. g. magnesium hydroxide, magnesium carbonate or basic carbonate, magnesium acetate, magnesium alcoholate or the like, or by oxidizing magnesium metal. The magnesia can be obtained, for instance, by reacting a water solution of a magnesium salt, such as inland brine, sea water, bitterns or the like, with an alkali such as lime, calcined dolomite, caustic soda, caustic potash or other alkali, to precipitate magnesium hydroxide, and washing and separately recovering the precipitate and calcining. Magnesium carbonate obtained by the precipitation methods well known in this art can also be calcined to form the magnesia. The magnesia can be employed in the active, hardburned or deadburned state, or as periclase. It can be obtained by firing in a rotary or stack or shaft kiln, or by electrical fusion. In practice, a high-purity magnesia is preferred, although any deadburned magnesite is suitable. The deadburned magnesites usually contain from about 82% to 92% MgO, although some varieties contain even less MgO. Preferably, where high refractoriness and high bonding strengths are desired the magnesia is of high purity, containing at least 95.0% MgO, not over 2.0% CaO and not over 2.0% $SiO_2$. Mixtures of the magnesia components can be employed.

In preparing the cementitious refractory composition according to the present invention, the components can be mixed together and can then be used immediately or stored, or shipped. It is preferred to grind each component separately and mix the ground materials. If desired, the magnesia component and the chromium component can be ground together, and this interground mixture or material can then be mixed with the boron component. Powdering of the components facilitates more uniform interdispersion. Suitably, the materials are of a size to pass through a screen having 40 meshes to the linear inch, and, preferably, to pass 100 mesh, especially the materials insoluble or slowly soluble in the mixing liquid, such as magnesia, insoluble borates, boric acid etc.

The cementitious refractory composition can be employed as a mortar or cement, or as a bond with grains or aggregates in forming refractory shapes or ramming mixes or maintenance material, or as the cement component for refractory concretes wherein aggregates are also employed. The refractory shapes can be formed by pressing or ramming, in the manner known to the art, or they can be formed by casting. Where aggregates or grains are employed, they can be of any refractory material, for example, non-acid grains such as periclase, deadburned magnesite, high purity periclase, olivine, forsteritic periclase, chromite, spinels such as magnesia-alumina, magnesia-chrome, chrome-iron oxide, magnesia-iron oxide, or dead-burned dolomite, mixtures of chrome and magnesia grains in any desired proportion, salvaged chromite brick, salvaged magnesite brick, alumina, carbon, mill scale, iron ore, etc., or mixtures of any of these materials, or acid grains or mixtures thereof. Where the cementitious composition is employed as a bond in forming refractory shapes, such as bricks or tiles, or in ramming mixes, it can preferably constitute from about 10% to about 50% of the total mix; when employed as a mortar, it is used as mixed, that is, without aggregate or with only a minor portion of aggregate, in the same manner as mortars hitherto known to the art. When employed in refractory concretes, from about 10% to about 60%, preferably about 30% of the cementitious composition is admixed, or in other words, sufficient to give workability to the mix. These amounts are based on the total dry weight of the ingredients, of the unfired mixes. When making up batches, the grain sizes of the aggregates can, if desired, be selected in order to provide dense packing, in the known manner. However, alternatively, random grain sizes can be employed in various batches; and very large grains or aggregates, up to 3 inches or more in diameter, can be employed in concretes, for example, because the cementitious, or bonding, composition remains constant in volume during curing or the formation of the chemical or cold bond and upon firing, and the hitherto known undesired shrinkage, cracking and other disadvantageous results are overcome.

It is an advantage of the cementitious composition of this invention that dense refractory masses, substantially free of shrinkage and cracking or pulling away from the aggregate, are obtained without the necessity for careful sizing of the grain or aggregates employed; and, if desired, are obtainable by casting the grain-bond mixes. It is also an advantage that the boron compound inhibits swelling due to hydration. It is a further advantage that the refractory cementitious composition bonds excellently to many sorts of non-acid grains, particularly chrome ore, which has been notoriously difficult to bond in many applications. It is another advantage that refractory shapes or pieces of very large size, for instance, furnace roof sections, furnace bottoms, soaking pit hearth sections, and the like, can be cast successfully and without the occurrence of deformation or cracking upon drying or firing. It is a special advantage that less water or liquid can be employed in mixing batches of the present cementitious composition, than in preparing the refractory batches of the earlier art. It is a particular advantage of this invention that the cementitious composition, or refractory batches containing it, exhibit higher strengths after intermediate firing; and that the strength increases with greatly increased rapidity after passing through the minimum strength zone. This is illustrated more clearly by the accompanying drawing Figure 1, which shows graphically the strengths of portions of the cementitious compositions, as noted, after firing to the temperatures indicated. This graph shows strengths as determined upon the composition, or the "neat cement," itself, but the strengths are correspondingly higher also when the composition is admixed with aggregate. For example, bricks prepared according to this invention, and formed under pressures of the order of about 8000 lbs. per sq. in., have exhibited a minimum crushing strength, after firing to intermediate temperatures, of about 5000 lbs. per sq. in.

The tests represented by the graphs were carried out as follows:

To form a batch A, there are admixed 92% of a periclase grain mix of the following composition by sizes, 16% passing 40 mesh and retained on 100 mesh, 24% passing 100 mesh and retained on 325 mesh and 60% passing 325 mesh, and 6% of a magnesia-chrome mixture obtained by grinding together in a ball mill 1 part by weight of chromic acid and 4 parts by weight of high-purity magnesia, and 2% of powdered boric acid. The ingredients are thoroughly blended dry in a pan-type mixer and water is then added in sufficient quantity (about 10.5%) to produce a uniform putty-like consistency. This is placed in a mold, consolidated by hand working, and cured for 6 to 8 hours at 80° C., after which time the mold is removed.

The sample is cut into one-inch cubes and the cubes are heated in a furnace to 400° C. in 4 hours, then to the desired temperature at a more rapid rate. The samples are held at the testing temperature for 45 minutes, then removed and rapidly air-quenched. Crushing strengths are obtained by means of a hydraulic press. The results are plotted in Figure 1 as curve A.

Another cement batch, B, is prepared in the same manner except that no chromic acid is added, and only about 11.0% of water, based on the dry mix, is required for proper consistency. That is to say, there are admixed 92% of the grain mix, 6% of high-purity magnesia and 2% of powdered boric acid. This batch B is mixed, formed, and fired as described for A and the crushing strengths corresponding to the respective testing temperatures are plotted to give curve B. A third cement batch, C, is prepared in the same manner as A except that no boron compound is added and about 12.9% water is employed for mixing; that is to say, there are admixed 93.9% of the grain mix and 6.1% of the magnesia-chromic acid intergrind, and the mixture is formed and fired as above, the results being plotted to give curve C.

Figure 1 shows that the strengths after intermediate firing increase very rapidly from the minimum value (in this example, at around 925–950° C.) when the cementitious composition is made according to this invention. Furthermore, the minimum strengths are very much greater than where either the boron compound or the chromium compound is added alone. Neither of these results, shown in the curves, would be expected from the behavior of the cement compositions made with the boron compound alone or with the chromium compound alone.

Figure 2:
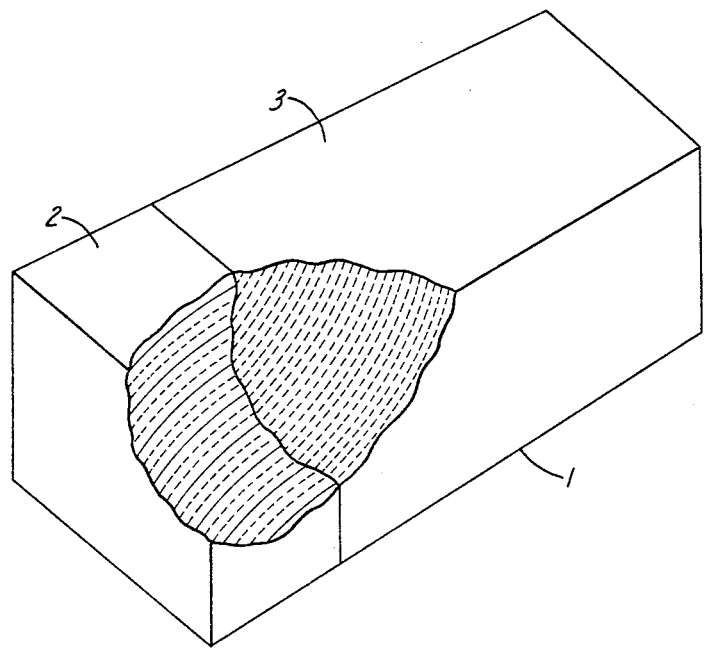

Figure 2 shows a brick 1, partially broken away, made according to the invention and comprising a refractory portion 3 and an insulating portion 2. This embodiment is made as described in Example 9 below.

The following examples will illustrate more clearly the cementitious refractory composition, methods of preparation thereof, and refractory compositions comprising this cementitious component.

*Example 1*

A concrete suitable for casting into a bottom for an electric furnace for casting steel is made as follows: Chromite ore is crushed and a grain mix is prepared which contains 61.5% of grains passing 1 inch and retained on ¼ inch mesh, and 38.5% of grains passing 4 mesh and retained on 40 mesh, these grain distributions being approximately that of the material as it comes from the crusher. A cement mix is prepared by admixing 15% of high-purity periclase grain made according to the method of U. S. 2,487,290, of a size to pass 40 mesh and be retained on 100 mesh, 22% of the same periclase of a size to pass 100 mesh and be retained on 325 mesh, and 55% of the same periclase passing 325 mesh, 6% of a magnesia-chrome mixture made by ball-milling together 1 part by weight chromic acid and 4 parts by weight high-purity magnesia, and 2% of powdered boric acid. In utilization of the concrete, 65% by weight of the grain mix and 35% by weight of the cement composition are admixed, with the addition of about 7% of water, based on the total weight of dry ingredients (or, in other words, 61% grain, 32.5% cement and 6.5% water, based on the total water-containing composition) and the mixture so obtained is cast into place in the furnace bottom where it sets to a dense, hard mass, substantially free of cracks or shrinkage, and wherein substantially no shrinkage is exhibited upon firing.

It is a particular advantage in employing this cement with chrome aggregate in furnace bottoms in stainless steel-making that, if the lining is attacked by the slag or charge an amount of chromium can be reduced from the chrome aggregate and incorporated in the steel while at the same time the remaining refractory is still relatively more resistant to attack by the slag than a more basic lining, e. g. of magnesite.

*Example 2*

There have been several problems heretofore encountered in making satisfactory bottoms for forging furnace hearths. These furnaces are heated to only moderately high temperatures, for example, 1200° C. to 1300° C., and cast bottoms have therefore in the past developed a relatively shallow hard burned crust. The charging of heavy forgings to the furnace has tended to break down this upper hard layer or crust, exposing unburned, or insufficiently burned, weaker portions of the refractory bottom and resulting in early failure. On the other hand, the height of the interior of the furnace is relatively small and this renders it difficult to ram in a satisfactory bottom. This example describes a refractory concrete suitable for casting into a forging furnace bottom, which has a sufficiently increased strength in the portion not exposed to the higher burning-in temperatures developed in the heating zone, that early failure is avoided, the refractory withstands the shocks and stresses imposed by the charging or tumbling of heavy forgings and the life of the bottom is greatly increased. The incorporation of cullet, or ground glass, or a low-melting mineral, increases resiliency of the burned surfaces of the refractory, also increasing resistance to breakdown by the forgings. A refractory concrete suitable for such use is made as follows: Chromite ore is crushed in a jaw crusher, the resulting pieces being sized as follows: 35% passing one inch and retained on 4 mesh, 35% passing 4 mesh and retained on 10 mesh, 30% passing 10 mesh and retained on 40 mesh. With 51% by weight of this chromite grain mix are admixed 7% of periclase, passing 20 mesh and retained on 30 mesh, and crystallized by firing a periclase-yielding material with about 0.25%, calculated as $Cr_2O_3$, of a chromium material as defined in U. S. 2,487,290, and 6% of cullet. There is then admixed with the total grain mixture 35% of the cementitious component prepared as described in Example 1. In use, this concrete mix is tempered with water, i. e., sufficient water is added to make a pourable or castable mass, and the mass is cast into the furnace bottom in the manner of pouring ordinary concrete, but suitably without sufficient working to seal the surface. The concrete sets in place and is then dried slowly to about 400° C. and is then fired.

*Example 3*

A dry concrete batch suitable for forming the lining of a door for an open hearth furnace is prepared by mixing 55% to 75% of grain or aggregate obtained by crushing salvaged basic brick in a jaw crusher to sizes passing 1.5 inch, with 25% to 45% of a cement made as in Example 1 except that the intergrind is prepared by grinding together in a ball mill one part by weight of chromic acid and 4 parts by weight of periclase. (The lesser amounts of cement in the above range are useful where the grain or aggregate is selected or graded as to sizes for optimum packing, i. e. maximum density.) Chrome ore can be used to replace all or part of the above-mentioned salvaged basic brick. For placing in the door, the batch is mixed with 6% to 10% of water, based on total dry weight of the batch.

*Example 4*

A ramming mix suitable for high-temperature refractory applications is prepared as follows: As grain is employed high-purity well-crystallized periclase containing 95.6% MgO, 1.67% CaO and 1.85% $SiO_2$, obtained by firing magnesium hydroxide recovered by reacting sea water with calcined dolomite to precipitate $Mg(OH)_2$, washing the precipitate, filtering to obtain a filter cake of $Mg(OH)_2$, mixing the cake with ½% sodium dichromate and firing, to obtain well-crystallized periclase. The minus 100 mesh periclase of the batch constitutes the magnesia of the cement. The ramming mix comprises:

|  | Percent |
|---|---|
| Periclase minus 6 mesh plus 14 mesh | 43 |
| Periclase minus 20 mesh plus 40 mesh | 8 |
| Periclase minus 40 mesh plus 100 mesh | 6 |
| Periclase minus 100 mesh plus 325 mesh | 10 |
| Periclase minus 325 mesh | 31 |
| Magnesium chromate, $MgCrO_4$ | 1 |
| Boric acid, $H_3BO_3$ | 1 |

This mixture is admixed with about 6% of its weight of water just prior to ramming in. It sets to a hard, stable, dense mass in about 2 hours, and burns in without appreciable shrinkage.

*Example 5*

A cast bottom for a reheat furnace is made as follows: A dry concrete batch is prepared by admixing 70% by weight of deadburned magnesite grain as available in commerce, of sizes preponderantly larger than 14 mesh and 30% by weight of a cement made as described in Example 1. To this dry batch is added 7% of its weight of water, or sufficient to produce a consistency which will take the shape of the sub-hearth when worked moderately. This material takes a firm set upon curing and remains strong and dense at temperatures up to the softening point of the magnesite. However, to obtain increased strength and toughness or resiliency at intermediate firing temperatures, there can alternatively be admixed with the concrete up to about 15% of lower melting minerals, i. e. substances which have fusion or softening points of about 700° C. to 1100° C.; and such admixture is suitably employed in installations where relatively moderate temperatures are used, for example, in the reheat furnace herein referred to, or in forging furnace bottoms and the like.

*Example 6*

A refractory brick suitable for insulating application is made as follows: A non-acid grain of high porosity commonly known as an insulating material is used as the aggregate. This grain can be obtained by crushing bricks of high porosity or by preparing grain specifically for this purpose. 65% by volume of the high-porosity grain, sized to pass a 4-mesh but remain on a 20-mesh screen is blended with 35% by volume of the cement described in Example 1, and the whole thoroughly mixed with sufficient water to lubricate the mixture so that a well consolidated body exists in the brick mold on vibrating. The mixture is molded and cured in the mold at 80° C. for 4 to 5 hours. The mold is then removed and the brick fired at a temperature preferably exceeding 1300° C. and limited by the nature of the aggregate. Bricks made in this manner using a magnesia insulating grain have been heated to 1650° C. with no appreciable shrinkage. Bricks have been cast having a porosity of 60%.

*Example 7*

Pressed shapes, that is bricks, are made in the manner described below:

For grain a number of different materials can be used such as periclase, deadburned magnesite, chrome ore, salvaged crushed basic brick, olivine, etc. The following formula uses olivine, crushed and sized, and cement as described in Example 1.

| | Per cent |
|---|---|
| Olivine passing 6 mesh, retained on 14 mesh | 42 |
| Olivine passing 14 mesh, retained on 20 mesh | 10 |
| Olivine passing 20 mesh, retained on 40 mesh | 5 |
| Cement as Example 1 | 43 |
| Water added to temper | 3.5 |

The grain and bond materials are dry mixed and then the water is added in the mixer to temper. The mixture is then pressed into bricks and the bricks are cured for 24 hours at 85° C. The brick can be used either in the unfired condition or fired. Bulk density is 174 lbs. per cu. ft., and after firing to 1400° C. is 172 lbs. per cu. ft. Failure under 25 lbs. per sq. in. load occurred in this test at 1675° C. Crushing strength after firing to the intermediate temperature low point is 2100 lbs. per sq. in., and at a temperature 100° C. higher, is 5900 lbs. per sq. in.

*Example 8*

In many applications of refractories it has proved desirable to provide metal along one or more surfaces of the brick. This may be done to provide a bond between bricks on firing, to allow for thermal expansion, to cause growth of brick due to chromite swelling, to permit cooling due to conduction through the metal, etc. The practice has been to place metal plates along the desired surface or to press the plates into the brick on forming it. By casting the refractory into sheet metal molds and allowing the mold to remain as a part of the refractory, several added advantages are obtained. Practically any shaped refractory can be metal cased on almost any dimension and at a low cost. Metal inserts and pieces such as hanger hooks, cooling rods, etc., can be made an integral part of the finished shape. An example of a cast, metal cased refractory is made as follows:

A mold of the desired metal is fabricated, for example, of 16 to 22 gauge sheet iron. If the construction is not rigid enough or the metal not strong enough to retain its shape when full of cement, some form of exterior stiffening is required. An aggregate is prepared by crushing salvaged magnesia chrome brick to about 1 inch top size.

| | Per cent |
|---|---|
| Crushed brick passing 1 inch, retained on 20 mesh | 65 |
| Cement as in Example 1 | 35 |

These materials are dry mixed and then tempered with enough water to allow casting into the mold with hand working or vibrating.

The concrete is placed in the mold and consolidated by working. At this point any inserts which were not built into the mold can be worked into the plastic mass and will become firmly fixed when the casting is cured. This curing is done at about 80° C. for 4 to 8 hours, depending on the size of the casting. It is then heated to 200° C.–300° C. for an equal length of time.

*Example 9*

Insulation is applied to many furnaces in the form of a layer of loose grain or as a layer of insulating brick. In some installations advantages may be obtained by having this insulation inherent in the shape. For example, if a furnace wall is to be laid up with a refractory hot face and an insulating back-up, a single refractory shape which incorporated a layer of insulation in one end could be used. There can thus be made a composite, integral, shaped refractory product comprising an insulating portion of higher porosity and bonded thereto a dense refractory portion, the insulating portion comprising a major portion of high porosity grain and a minor portion of a cementitious composition containing finely divided magnesia, from about 0.25% to about 5.0% of a boron compound, calculated as $B_2O_3$, and from about two-thirds to about three times the amount of the boron compound of a water-soluble chromium compound, calculated as $CrO_3$, the dense refractory portion comprising a major portion of a dense refractory non-acid grain material and a minor portion of the said cementitious composition. Such a refractory is made by the following method: A vertical brick mold is assembled and the following material prepared:

| | Per cent |
|---|---|
| Chromite ore passing 2 mesh, retained on 4 mesh | 40 |
| Chromite ore passing 4 mesh, retained on 14 mesh | 13 |
| Chromite ore passing 40 mesh, retained on 100 mesh | 12 |
| Periclase minus 100 mesh (70% minus 325 mesh) | 32 |
| $CrO_3$ (added as an intergrind of 1 part chromic acid and 3 parts periclase) | 1 |
| $H_3BO_3$, powdered | 2 |

The ingredients are dry-mixed, about 7% water added, mixed, and the cement placed in the mold. The mold is filled to the desired depth, approximately 7 inches. The insulating layer is cast in place on top of this refractory before the lower layer has taken a set. This insulating layer can be of the type described in Example 6, or can be made as follows:

| | Per cent |
|---|---|
| Petroleum coke minus 4 mesh, plus 28 mesh | 50 |
| Periclase minus 14 mesh, plus 20 mesh | 10 |
| Cement as in Example 1 | 40 |

Tempering water is added to provide enough plasticity for casting. The piece is cured at about 80° C. for 6 to 8 hours at which time the mold is removed and the piece is heated to 150° C. if it is to be used chemically bonded. If the brick is to be burned the heating must be slow (50° C. per hour) to 1000° C. at which time 100° C. per hour to 1500° C. may be the rate. The temperature should remain over 1350° C. for 4 or 5 hours. The bond between the insulating layer and the refractory layer is continuous and strong. The insulation layer is 60–70% pore space.

In addition to the above specific examples, the cementitious composition of this invention has been found to be very advantageous for use in making semi-refractory materials, for example, investment molds, as for the precision casting of ferrous and nonferrous metals, because of its great volume stability and retention of its precise form upon drying. One advantage of its use in these operations is that, after casting lower-melting metals, the cementitious mold is rather easily removed. An insulating refractory product can be prepared by admixing the cementitious composition of the invention and, as grain or aggregate, a material or mixture of materials which burn out or are driven off during firing, leaving a refractory mass having a plurality of voids. An insulating refractory can also be made by admixing the cementitious composition with an agggregate comprising granular diatomaceous earth, which can, if desired, be calcined. For other special purposes and effects there can also be employed acid grains or aggregates as known in the refractory art, that is, silica, quartz, sandstones, clays, characteristically siliceous materials having less than 2 mols of base per mol of silica or other acid materials. This cementitious composition is also useful in making spray mixes and in preparing large cast pieces of special shapes, such as rings or rosettes for soaking pit hearths, kiln or cupola blocks, tuyère blocks, metal-cased shapes of any design, tongue-and-groove or interlocking shapes, and the like; and, on the other hand, when combined with small grains, or when used alone, it is useful in slip-casting or in the casting of small tubes such as pyrometer tubes, insulators, etc.

The amounts of liquid, such as water, or other liquid, employed to temper the mixes vary depending upon the application, kind and sizing of aggregate, amount of bond employed, and other factors. In general, and in accord with usual good refractory, ceramic, or concrete practices, from about 2% to about 6% of liquid is employed in making pressed objects or products; from about 4% to about 8%, in ramming mixes; and from about 5% to about 70% in making castings or slip-cast articles, from about 5% to about 20% being preferably used where larger aggregates are employed in the concrete-type of mixes and the larger amounts being preferably employed in making slip-castings. These percentages of water or liquid are based on the total weight of dry ingredients in a mixture or batch. It is preferred to dry the mixed batches rather slowly, that is, for instance, to raise the temperature slowly up to about 400° C., when the product is being fired. When the products are pressed, pressures as desired, or as usual in practice, are employed, for example, of 1000 to 10,000 lbs. per sq. in., but this follows the usual good practice well known in the art.

Percentages, ratios and parts as expressed in the specification and appended claims are by weight, except as otherwise indicated and with the exception also that porosity is expressed in percent by volume. Screen sizes are those of United States Bureau of Standards screens (meshes per linear inch). The amount of chromium compound added is from two-thirds to three times the amount of boron compound employed; or, stated in another manner, the chromium compound is added in a ratio (by weight) of from 3:1 to 1:1.5 with respect to the amount of boron compound. Where a lower melting point mineral component, having a fusion, or softening, point of from 700°–1100° C., is employed, for example to increase resiliency and toughness of furnace bottoms for special uses, some of which have been described above, it is preferred to add up to about 15% thereof, based on the weight of the total batch. Where "boric acid" is referred to herein, orthoboric acid, $H_3BO_3$, is meant unless otherwise indicated.

In conformity with common practice in reporting chemical analyses of refractory materials, in the specification and claims the proportions of the various chemical constituents present in a material are given as though these constituents were present as the simple oxides. Thus the magnesium constituent is reported as magnesium oxide or MgO, the silicon constituent as silica or $SiO_2$, and so forth, although some magnesia and the silica may be present as a magnesium silicate, for example. The chromium compound additive is expressed as $CrO_3$ equivalent although it may actually be added as magnesium chromate, sodium dichromate or other substance. The boron component is similarly expressed as $B_2O_3$. While the manner of operation of the invention is not known, it has been observed that all or substantially all of the added boron remains in the fired product; and it is believed that the boron component enters into some chemical combination, probably first reacting with the magnesia component and this reaction product may then form some sort of complex with the chromium component. Whatever the actual combined state or states of the fired or unfired components may be, they are individually expressed as the oxides as set forth above.

Having now described the invention what is claimed is:

1. A cementitious refractory material consisting essentially of finely divided magnesia, from about 0.25% to about 5.0% of a boron compound as added, calculated as $B_2O_3$, and a chromium compound, calculated as $CrO_3$, in a ratio of from 3:1 to 1:1.5 with respect to the amount of said boron compound calculated as $B_2O_3$, said chromium compound being soluble in the tempering liquid employed in forming the final mixture.

2. A cementitious refractory composition consisting essentially of finely divided magnesia, from about 0.25% to about 5.0% of a boron compound as added, calculated as $B_2O_3$, soluble in the liquid employed in forming the final mixture, a chromium compound, soluble in said liquid, in a ratio of from 3:1 to 1:1.5 with respect to the amount of said boron compound calculated as $B_2O_3$, said chromium compound being calculated as $CrO_3$.

3. Composition as in claim 2 wherein said boron compound is boric acid.

4. Composition as in claim 2 wherein said chromium compound is chromic acid.

5. Composition as in claim 2 wherein said chromium compound is magnesium chromate.

6. A cementitious refractory composition consisting essentially of finely divided magnesia, from about 0.25% to about 5.0% of a boron compound as added, calculated as $B_2O_3$, soluble in the tempering liquid employed in forming the final mixture, a chromium compound, soluble in said liquid, in an amount of from 1 to 1.5 times the amount of said boron compound calculated as $B_2O_3$, said chromium compound being calculated as $CrO_3$.

7. A cementitious refractory composition consisting essentially of finely divided, high purity magnesia, 1% of a water-soluble chromium compound calculated as $CrO_3$, and 1% of a water-soluble boron compound, as added, calculated as $B_2O_3$.

8. A cementitious refractory composition consisting essentially of finely divided magnesia, from about 0.25% to about 5.0% of a boron compound as added, calculated as $B_2O_3$, and a chromium compound, soluble in the tempering liquid employed in forming the final mixture, calculated as $CrO_3$, in an amount of from two-thirds to one times the amount of boron compound calculated as $B_2O_3$.

9. A cementitious refractory composition consisting essentially of finely divided magnesia, from about 0.25% to about 5.0% of a boron compound as added, calculated as $B_2O_3$, and a chromium compound, soluble in the tempering liquid employed in forming the final mixture, calculated as $CrO_3$, in an amount of from two-thirds to three times the amount of boron compound calculated as $B_2O_3$.

10. Composition as in claim 9 wherein said chromium compound, calculated as $CrO_3$, is present in an amount of at least 1.0%.

11. A cementitious refractory composition consisting essentially of finely divided magnesia containing at least 95% MgO, not over 2% CaO and not over 2% $SiO_2$, from about 0.25% to about 5.0% of a boron compound, as added, calculated as $B_2O_3$ and a water-soluble chromium compound calculated as $CrO_3$, in a ratio of from 3:1 to 1:1.5 with respect to the amount of said boron compound.

12. A cementitious refractory composition consisting essentially of finely divided magnesia, from about 0.25% to about 5.0% of at least one boron compound, as added, chosen from the group consisting of orthoboric acid, metaboric acid, tetraboric acid, perboric acid and the ammonium, alkali metal and alkaline earth metal salts of said acids, and a chromium compound, calculated as $CrO_3$, soluble in the tempering liquid employed in forming the final mixture, in a ratio of from 3:1 to 1:1.5 with respect to the amount of said boron compound.

13. Composition as in claim 12 wherein said chromium compound, calculated as $CrO_3$, is present in an amount of at least 1.0%.

14. A dry refractory composition which comprises a refractory aggregate and from 10% to 60% of a cementitious refractory composition consisting essentially of finely divided magnesia, from 0.25% to 5.0% of a boron compound as added, calculated as $B_2O_3$ and based on the total weight of said cementitious composition, and a chromium compound, calculated as $CrO_3$, soluble in the tempering liquid employed in forming the final mixture, in a ratio of from 3:1 to 1:1.5 with respect to the amount of said boron compound.

15. Composition as in claim 14 wherein said aggregate is non-acid aggregate.

16. Composition as in claim 14 wherein said aggregate is acid aggregate.

17. Composition as in claim 14 wherein said aggregate is chrome ore.

18. Composition as in claim 14 wherein said aggregate is periclase.

19. Composition as in claim 14 wherein said aggregate is porous refractory grain material.

20. Composition as in claim 14 wherein there is added up to about 15% of a mineral having a fusion point of from 700° C. to 1100° C.

21. Composition as in claim 14 containing from 25% to 45% of said cementitious composition.

22. A shaped refractory product comprising non-acid aggregate, and from about 10% to about 50% of a bond material, said bond material consisting essentially of finely divided magnesia, from about 0.25% to about 5.0% of a boron compound as added, calculated as $B_2O_3$, and a chromium compound, calculated as $CrO_3$, soluble in the tempering liquid employed in forming the final mixture, in a ratio of from about 3:1 to 1:1.5 with respect to the amount of said boron compound.

23. Product as in claim 22 wherein said non-acid aggregate is periclase.

24. Product as in claim 22 wherein said non-acid aggregate is chrome ore.

25. Product as in claim 22 wherein said non-acid aggregate is olivine.

26. Product as in claim 22 wherein said non-acid aggregate is porous refractory grain material.

27. A composite, integral, shaped refractory product comprising an insulating portion of higher porosity and bonded thereto a dense refractory portion, said insulating portion comprising a major portion of high porosity grain and a minor portion of a cementitious composition consisting essentially of finely divided magnesia, from about 0.25% to about 5.0% of a boron compound as added, calculated as $B_2O_3$, and from about two-thirds to about three times the amount of said boron compound of a water-soluble chromium compound, calculated as $CrO_3$, said dense refractory portion comprising a major portion of a dense refractory non-acid grain material and a minor portion of said cementitious composition.

28. Process for making a cast refractory composition which comprises admixing refractory grain material and from about 10% to about 60% of a cementitious refractory composition consisting essentially of finely divided magnesia, from about 0.25% to about 5.0% of a boron compound as added, calculated as $B_2O_3$, and from about two-thirds to about three times the amount of said boron compound of a water-soluble chromium compound, calculated as $CrO_3$, and from about 5% to about 70% of water based on the total weight of dry ingredients, casting said admixture, hardening and drying.

29. Process as in claim 28 wherein said admixture is cast into metal cases and hardened and dried therein.

30. Process as in claim 28 wherein there is admixed from about 5% to about 20% of water.

31. Process for making a shaped refractory product which comprises admixing non-acid refractory grain material, from about 10% to about 50% of a cementitious refractory composition consisting essentially of finely divided magnesia, from about 0.25% to about 5.0% of a boron compound as added, calculated as $B_2O_3$, and from about two-thirds to about three times the amount of said boron compound of a water-soluble chromium compound, calculated as $CrO_3$, tempering said admixture with water, pressing into shapes, hardening and drying.

32. Process for making a refractory ramming mix which comprises admixing non-acid refractory grain material, from about 10% to about 50% of a cementitious refractory composition consisting essentially of finely divided magnesia, from about 0.25% to about 5.0% of a boron compound as added, calculated as $B_2O_3$, and from about two-thirds to three times the amount of said boron compound of a water-soluble chromium compound, calculated as $CrO_3$ and tempering said admixture with from about 4% to about 8% of water, based on total weight of dry ingredients.

33. A refractory composition which comprises a refractory aggregate and from 10% to 60% of a cementitious refractory composition consisting essentially of finely divided magnesia, from 0.25% to 5.0% of orthoboric acid as added, calculated as $B_2O_3$, and a chromium compound, calculated as $CrO_3$, soluble in the tempering liquid employed in forming the final mixture in a ratio of from 3:1 to 1:1.5 with respect to the amount of said boron compound.

34. A refractory ramming mix which comprises periclase grain material and from about 10% to about 50% of a cementitious refractory composition consisting essentially of finely divided magnesia, from about 0.25% to about 5.0% of a water-soluble boron compound as added, calculated as $B_2O_3$, and from about two-thirds to three times the amount of said boron compound of a water-soluble chromium compound, calculated as $CrO_3$.

References Cited in the file of this patent

UNITED STATES PATENTS

| | | |
|---|---|---|
| 2,364,002 | Schoenlaub | Nov. 28, 1944 |
| 2,537,013 | Austin et al. | Jan. 9, 1951 |
| 2,571,101 | Austin | Oct. 16, 1951 |

FOREIGN PATENTS

| | | |
|---|---|---|
| 13,687 | Switzerland | 1897 |